(12) United States Patent
Kumayasu et al.

(10) Patent No.: US 6,563,236 B2
(45) Date of Patent: May 13, 2003

(54) FEED LINE SWITCHING CIRCUIT AND BRANCHING UNIT

(75) Inventors: Satoshi Kumayasu, Tokyo (JP); Eiichi Nakagawa, Tokyo (JP); Kenichi Asakawa, Tokyo (JP); Kazunori Sato, Tokyo (JP)

(73) Assignees: Mitsubishi Denki Kabushiki Kaisha, Tokyo (JP); KDDI Submarine Cable Systems Inc., Tokyo (JP)

( * ) Notice: Subject to any disclaimer, the term of this patent is extended or adjusted under 35 U.S.C. 154(b) by 0 days.

(21) Appl. No.: 10/195,391

(22) Filed: Jul. 16, 2002

(65) Prior Publication Data

US 2003/0015921 A1 Jan. 23, 2003

(30) Foreign Application Priority Data

Jul. 18, 2001 (JP) ........................... 2001-218554

(51) Int. Cl.⁷ .................................................. H02J 7/00
(52) U.S. Cl. ........................ 307/112; 307/125; 361/160; 385/100
(58) Field of Search ................................ 307/112, 116, 307/125, 131; 361/160, 170, 187, 191; 385/100, 53; 359/109

(56) References Cited

U.S. PATENT DOCUMENTS

| | | | |
|---|---|---|---|
| 4,798,969 A | | 1/1989 | Inoue et al. |
| 5,644,466 A | * | 7/1997 | Ohta et al. .................. 361/191 |
| 5,790,358 A | * | 8/1998 | Kojima et al. ............... 307/127 |

FOREIGN PATENT DOCUMENTS

| | | | |
|---|---|---|---|
| JP | 01-198123 | 8/1989 | |
| JP | 7-34550 | 4/1995 | |
| JP | 11-186959 | 7/1999 | |
| JP | 02001230707 A | * 8/2001 | ............ H04B/3/44 |

\* cited by examiner

*Primary Examiner*—Brian Sircus
*Assistant Examiner*—Calixto Rodriguez
(74) *Attorney, Agent, or Firm*—Oblon, Spivak, McClelland, Maier & Neustadt, P.C.

(57) ABSTRACT

A feed line switching circuit includes a relay connected between feed lines, a normally close contact of the relay, and a resistor that constitutes a series circuit with the normally close contact, which series circuit is connected in parallel with the relay. The resistance of the coil of the relay and the resistance of the resistor are determined to satisfy the condition that the current flowing through the relay after energizing the relay can prevent the chattering of the relay. Thus, the feed line switching circuit can positively carry out the feed line switching.

7 Claims, 5 Drawing Sheets

FEED LINE SWITCHING CIRCUIT AND BRANCHING UNIT

BACKGROUND OF THE INVENTION

1. Field of the Invention

The present invention relates to a feed line switching circuit for switching a feed line by energizing relays by feed current control, and more particularly to a feed line switching circuit suitable for a branching unit constituting an optical submarine cable system.

2. Description of Related Art

FIG. 7 is a circuit diagram showing a configuration of a conventional feed line switching circuit disclosed in Japanese patent application publication No. 7-34550/1995, for example. In FIG. 7, reference numerals 1*a*–1*c* each designate a feed line for feeding repeaters and the like with a current; 2*a*–2*c* each designate a power supply such as a DC constant current source; and the reference numeral 3 designates a ground.

The reference numeral 4 designates a feed line switching circuit for switching the feeding from the feeding across the feed lines 1*a* and 1*b* to the feeding across the feed lines 1*a* and 1*c* or vice versa by feed current control. In the feed line switching circuit 4, reference numerals 5*a*–5*c* designate terminals connected to the feed lines 1*a*–1*c*.

The reference symbol K1 designates a relay connected between the feed lines 1*a* and 1*b;* K2 designates a relay connected between the feed lines 1*a* and 1*c;* reference numerals K3 and K4 designates relays connected in series across the feed lines 1*b* and 1*c*. The relays K1–K4 each consist of a vacuum relay or the like that operates in response to a feed current. The reference symbol k1-1 designates a contact set of the relay K1; k2-1 designates a contact set of the relay K2; reference symbols k3-1 and k3-2 each designate a contact set of the relay K3; and k4-1 and k4-2 each designate a contact set of the relay K4.

Next, the operation of the conventional feed line switching circuit will be described.

First, to achieve the feeding across the feed lines 1*a* and 1*b*, the power supplies 2*a* and 2*b* are driven so that the feed current flows from the power supply 2*a* to the power supply 2*b* through the feed line 1*a,* terminal 5*a,* relay K1, contact k4-2, contact set k2-1, terminal 5*b* and feed line 1*b*. As a result, repeaters (not shown) connected to the feed lines 1*a* and 1*b* are supplied by double-end feed. In this state, when the feed current reaches the working current of the relay K1, the relay K1 actuates its contact set k1-1 to open the connection across the feed lines 1*a* and 1*c,* and to close the connection between the relay K3 and the feed line 1*c*. Furthermore, the power supply 2*c* is driven to pass the feed current through the ground 3, relay K3, contact set k1-1, terminal 5*c,* feed line 1*c* and power supply 2*c*. As a result, the repeaters connected to the feed line 1*c* are supplied by single-end feed. When the feed current reaches the working current of the relay K3, the relay K3 closes its contact k3-1 and opens its contact k3-2, thereby self-holding the connection between the relay K3 and the feed line 1*c*.

Likewise, to achieve the feeding across the feed lines 1*a* and 1*c,* the power supplies 2*a* and 2*c* are driven so that the feed current flows from the power supply 2*a* to the power supply 2*c* through the feed line 1*a,* terminal 5*a,* relay K2, contact k3-2, contact set k1-1, terminal 5*c* and feed line 1*c*. As a result, the repeaters connected to the feed lines 1*a* and 1*c* are supplied by double-end feed. In this state, when the feed current reaches the working current of the relay K2, the relay K2 actuates its contact set k2-1 to open the connection across the feed lines 1*a* and 1*b,* and to close the connection between the relay K4 and the feed line 1*b*. Furthermore, the power supply 2*b* is driven to pass the feed current through the ground 3, relay K4, contact set k1-1, terminal 5*b,* feed line 1*b* and power supply 2*b*. As a result, the repeaters connected to the feed line 1*b* are supplied by single-end feed. When the feed current reaches the working current of the relay K4, the relay K4 closes its contact k4-1 and opens its contact k4-2, thereby self-holding the connection between the relay K4 and the feed line 1*b*.

In the conventional feed line switching circuit with the foregoing configuration, the impedance of the feed passage can sometimes vary because of the operation of the contacts, thereby varying the feed current flowing through the feed line switching circuit 4.

For example, assume that the feeding across the feed lines 1*a* and 1*b* is carried out by the feed current control when a breaking of the optical submarine cable on the side of the feed line 1*c* takes place, and a shunt fault occurs in which the end of the optical submarine cable on the side of the feed line 1*c* is grounded by seawater. In this case, the feed current passes not only through the passage of the power supply 2*a*—relay K1—power supply 2*b,* but also through the shunt fault point—relay K2—relay K1—power supply 2*b* transiently. When the sum of the two feed currents reach the working current of the relay K1, the relay K1 opens the contact set k1-1, thereby disconnecting the shunt fault point. Thus, at the time when the contact set k1-1 activates, the impedance of the feed passage seen from the feed line 1*b* to the feed line switching circuit 4 increases, so that the feed current flowing through the feed line switching circuit 4 is reduced transiently.

Thus, the feed current flowing through the feed line switching circuit 4 is reduced when the feed current reaches the working current of the relay K1 and the contact set k1-1 is opened. As a result, the feed current flowing through the relay K1 is reduced at the same time, and hence the relay K1 can return to unenergized state again. In such a case, the relay K1 will repeat the energized state and unenergized state (chattering), presenting a problem of disabling the switching of the feed line.

SUMMARY OF THE INVENTION

The present invention is implemented to solve the foregoing problem. It is therefore an object of the present invention to provide a feed line switching circuit and branching unit capable of positively switching the feed line with preventing the current reduction in the relay after it is energized, and hence capable of preventing its chattering.

According to a first aspect of the present invention, there is provided a feed line switching circuit for switching feeding by feed current control between feeding across a first feed line and a second feed line and feeding across the first feed line and a third feed line, the feed line switching circuit comprising: a relay that is connected between the first feed line and the second feed line, and operates in response to a feed current flowing through the relay; a first contact of the relay that closes when the relay is unenergized and opens when the relay is energized;, and a resistor that constitutes a series circuit with the first contact, which series circuit is connected in parallel with the relay, wherein a resistance r of the relay and a resistance R of the resistor are set to satisfy a relationship of $$(R/(r+R))\times Ia<Ib$$

where Ia is a current value flowing through the second feed line immediately before operation of the relay, and Ib is a current value flowing through the second feed line immediately after the operation of the relay.

Here, the relay may further comprise a second contact that is connected between the first feed line and the third feed line, and that closes when the relay is unenergized and opens when the relay is energized.

Besides, each of the resistors may consist of any one of a single resistor, a combination of a plurality of resistors and an assemblage of other elements that provides resistance in its entirety.

According to a second aspect of the present invention, there is provided a feed line switching circuit for switching feeding by feed current control between feeding across a first feed line and a second feed line and feeding across the first feed line and a third feed line, the feed line switching circuit comprising: a relay that constitutes a series circuit with a first resistor, and operates in response to a feed current flowing through the relay, the series circuit being connected between the first feed line and the third feed line; a first switching section of the relay that closes its first and second contacts and opens its first and third contacts when the relay is unenergized, and that closes its first and third contacts and opens its first and second contacts when the relay is energized; a second switching section of the relay that is connected between the first feed line and the second feed line, and that closes when the relay is unenergized, and opens when the relay is energized; a first line, a first end of which is connected to a connecting point of the relay and the first resistor, and a second end of which is connected to the first contact of the first switching section of the relay; a second resistor, a first end of which is connected to a relay side end of the series circuit, and a second end of which is connected to the second contact of the first switching section of the relay; and a second line, a first end of which is connected to the first resistor side of the series circuit, and a second end of which is connected to the third contact of the first switching section of the relay, wherein a resistance r of the relay and a resistance R of the second resistor are set to satisfy a relationship of $$(R/(r+R)) \times Ia < Ib$$

where Ia is a current value flowing through the third feed line immediately before operation of the relay, and Ib is a current value flowing through the third feed line immediately after the operation of the relay.

Here, each of the resistors may consist of any one of a single resistor, a combination of a plurality of resistors and an assemblage of other elements that provides resistance in its entirety.

According to a third aspect of the present invention, there is provided a branching unit comprising a feed line switching circuit, the feed line switching circuit comprising: a relay that is connected between the first feed line and the second feed line, and operates in response to a feed current flowing through the relay; a first contact of the relay that closes when the relay is unenergized and opens when the relay is energized; and a resistor that constitutes a series circuit with the first contact, which series circuit is connected in parallel with the relay, wherein a resistance r of the relay and a resistance R of the resistor are set to satisfy a relationship of $$(R/(r+R)) \times Ia < Ib$$

where Ia is a current value flowing through the second feed line immediately before operation of the relay, and Ib is a current value flowing through the second feed line immediately after the operation of the relay.

DETAILED DESCRIPTION OF THE PREFERRED EMBODIMENTS

The invention will now be described with reference to the accompanying drawings.

Embodiment 1

Figure 1:
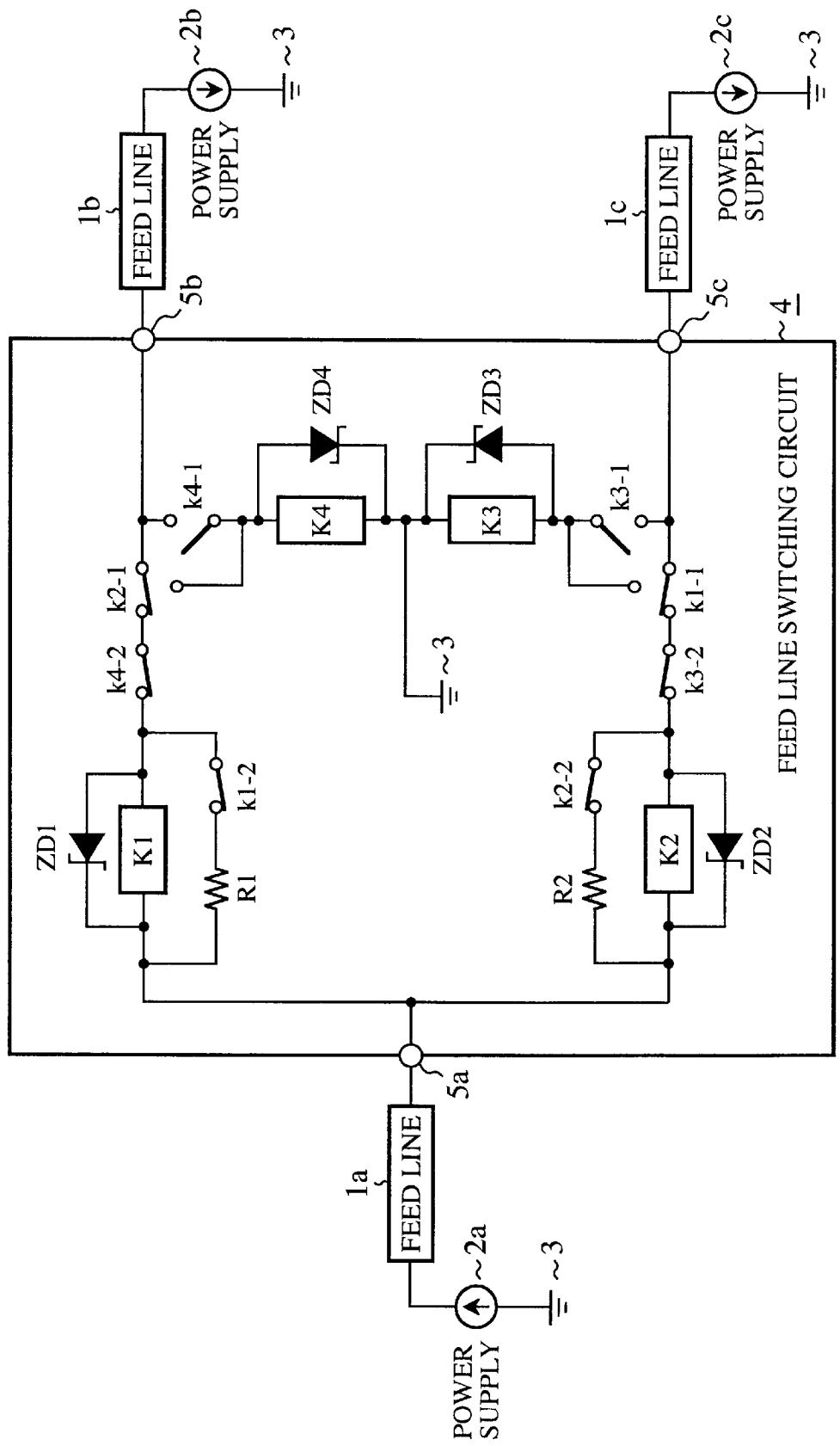
FIG. 1 is a circuit diagram showing a configuration of a feed line switching circuit of an embodiment 1 in accordance with the present invention.

FIG. 1 is a circuit diagram showing a configuration of a feed line switching circuit of an embodiment 1 in accordance with the present invention. In FIG. 1, reference numerals $1a$–$1c$ each designate a feed line for feeding repeaters and the like with power; $2a$–$2c$ each designate a power supply such as a DC constant current source; and the reference numeral 3 designates a ground.

The reference numeral 4 designates a feed line switching circuit for switching the feeding across the feed lines $1a$ and $1b$ to the feeding across the feed lines $1a$ and $1c$ or vice versa by feed current control. In the feed line switching circuit 4, reference numerals $5a$–$5c$ designate terminals connected to the feed lines $1a$–$1c$.

The reference symbol K1 designates a relay connected between the feed lines $1a$ and $1b$; K2 designates a relay connected between the feed lines $1a$ and $1c$; reference numerals K3 and K4 designates relays connected in series across the feed lines $1b$ and $1c$. The relays K1–K4 each consist of a vacuum relay or the like that operates in response to a feed current. The reference symbol k1-1 designates a contact set of the relay K1; k2-1 designates a contact set of the relay K2; reference symbols k3-1 and k3-2 each designate a contact of the relay K3; and k4-1 and k4-2 each designate a contact of the relay K4.

Furthermore, the reference symbol k1-2 designates a contact of the relay K1; and k2-2 designates a contact of the relay K2. The reference symbol R1 designates a resistor that constitutes a series circuit with the contact k1-2, which series circuit is connected in parallel with the relay K1; and R2 designates a resistor that constitutes a series circuit with the contact k2-2, which series circuit is connected in parallel with the relay K2. Reference symbols ZD1–ZD4 designate Zener diodes connected in parallel with the relays K1–K4, respectively.

Next, the operation of the present embodiment 1 will be described.

First, the principle of the present embodiment 1 will be described.

Figure 2:
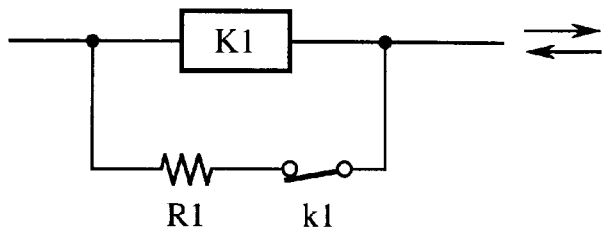
FIG. 2 is a circuit diagram showing a principle of a parallel circuit of the embodiment 1 in accordance with the present invention.

FIG. 2 is a circuit diagram illustrating the principle of a parallel circuit of the embodiment 1 in accordance with present invention. In FIG. 2, the reference symbol K1 designates the relay, k1 designates a normally close contact of the relay K1; and R1 designates a resistor that constitutes a series circuit with the contact k1, which series circuit is connected in parallel with the relay K1.

It is assumed here that the resistance of the relay K1 is r, and that of the resistor R1 is R, and that the contact resistance of the contact k1 is much smaller than the resistances r and R.

While the relay K1 is in the unenergized state, the feed current is divided to flow through the relay K1 side and the resistor R1 side. In this case, the current values Ir and IR flowing through the relay K1 side and the resistor R1 side are expressed by the following equations.

$$Ir=(R/(r+R))\times I$$

$$IR=(r/(r+R))\times I$$

where I is the feed current.

In contrast, while the relay K1 is energized, Ir=I.

Assume that the current value flowing through the feed line 1b temporarily drops from Ia to Ib because of the contact operation at a start of the feeding. In this case, the current Ioff flowing before the operation of the relay K1 is expressed as follows:

$$Ioff=(R/(r+R))\times Ia$$

In contrast, the current Ion flowing after the relay K1 is energized is expressed as follows:

$$Ion=Ib$$

Accordingly, by setting the resistances r and R such that the relationship Ioff<Ion, that is, $(R/(r+R))\times Ia<Ib$ is satisfied, the current flowing through the relay K1 after the actuation will not reduce, thereby preventing the chattering of the relay K1.

Next, the operation of the present embodiment 1 will be described with reference to FIG. 1.

First, to achieve the feeding across the feed lines 1a and 1b, the power supplies 2a and 2b are driven so that the feed current flows from the power supply 2a to the power supply 2b through the feed line 1a, terminal 5a, parallel circuit of the relay K1 with the resistor R1 and contact k1-2, contact k4-2, contact set k2-1, terminal 5b and feed line 1b. As a result, the repeaters (not shown) connected to the feed lines 1a and 1b are supplied by double-end feed. In addition, when the feed current reaches the working current of the relay K1, the relay K1 operates its contact set k1-1 to open the connection across the feed lines 1a and 1c, and to close the connection between the relay K3 and the feed line 1c. Furthermore, the relay K1 opens its contact k1-2, thereby disconnecting the resistor R1 connected in parallel with it. Moreover, the power supply 2c is driven to pass the feed current through the ground 3, relay K3, contact set k1-1, terminal 5c, feed line 1c and power supply 2c. As a result, the repeaters connected to the feed line 1c are supplied by single-end feed. When the feed current reaches the working current of the relay K3, the relay K3 closes its contact k3-1 and opens its contact k3-2, thereby self-holding the connection between the relay K3 and the feed line 1c.

Likewise, to achieve the feeding across the feed lines 1a and 1c, the power supplies 2a and 2c are driven so that the feed current flows from the power supply 2a to the power supply 2c through the feed line 1a, terminal 5a, parallel circuit of the relay K2 with the resistor R2 and contact k2-2, contact k3-2, contact set k1-1, terminal 5c and feed line 1c. As a result, the repeaters connected to the feed lines 1a and 1c are supplied by double-end feed. In addition, when the feed current reaches the working current of the relay K2, the relay K2 actuates its contact set k2-1 to open the connection across the feed lines 1a and 1b, and to close the connection between the relay K4 and the feed line 1b. Furthermore, the relay K2 opens its contact k2-2, thereby disconnecting the resistor R2 connected in parallel with it. Moreover, the power supply 2b is driven to pass the feed current through the ground 3, relay K4, contact set k2-1, terminal 5b, feed line 1b and power supply 2b. As a result, the repeaters connected to the feed line 1b are supplied by single-end feed. When the feed current reaches the working current of the relay K4, the relay K4 closes its contact k4-1 and opens its contact k4-2, thereby self-holding the connection between the relay K4 and the feed line 1b.

The Zener diodes ZD1–ZD4 connected in parallel with the relays K1–K4 are provided for the purpose of protecting the relays K1–K4 by bypassing the reverse current and excessive forward current of the relays K1–K4.

Next, test results of the configuration as shown in FIG. 1 will be described.

The test was performed in the following conditions: The working current of the relays K1 and K2 was 60 mA, and the resistance R of the resistors R1 and R2 was made equal to the resistance r of the relays K1 and K2.

First, the feed line 1c side was placed at a shunt fault state by grounding the terminal 5c, and the feed line switching circuit 4 was supplied with 80 mA from the power supply 2a. As a result, almost all the feed current flowed through the shunt fault point at the feed line 1c side with a small impedance, leaving little current flowing through the relay K1.

In this state, the feed line switching circuit 4 was supplied with a current of 80 mA flowing from the power supply 2b to the ground 3. As a result, the current flowing through the shunt fault point at the feed line 1c side became nearly zero mA, leaving a current of 40 mA flowing through each of the relay K1 and resistor R1.

In this state, the current value of the power supply 2b was gradually increased from the 80 mA. As a result, the relay K1 operated when the current value Ia was increased to 120 mA. Thus, the current flowing through the terminal 5a was increased to 120 mA after the operation of the relay K1 with maintaining the current value before the operation at 80 mA. The current value flowing through the relay K1 was 60 mA before the operation, and the current value Ib immediately after the operation was increased to 80 mA, and then to 120 mA.

Therefore, it becomes possible to satisfy the relationship $(R/(r+R))\times Ia<Ib$ by setting the current value Ia flowing through the feed line 1b immediately before the operation of the relay K1 at 120 mA, and the current value Ib flowing through the feed line 1b immediately after the operation of the relay K1 at 80 mA, and by setting the resistance r of the relay K1 equal to the resistance R of resistor R1. As a result, the current flowing through the relay K1 increases with the operation of the relay K1 instead of being reduced, thereby preventing the chattering.

As described above, the present embodiment 1 comprises the resistor R1 for preventing the reduction in the current value flowing through the relay K1. As a result, it can positively switch the feed line without reducing the current value flowing through the relay K1 after the operation of the relay K1 even if the shunt fault occurs at the feed line 1c side, thereby preventing the chattering of the relay K1.

In addition, since the resistor R1 is disconnected at the same time as the contact set k1-1 for switching the feed line is opened, the resistor R1 can accomplish its function to prevent the reduction in the current value flowing through the relay K1 at the same time when the feed line is switched.

Embodiment 2

Figure 3:
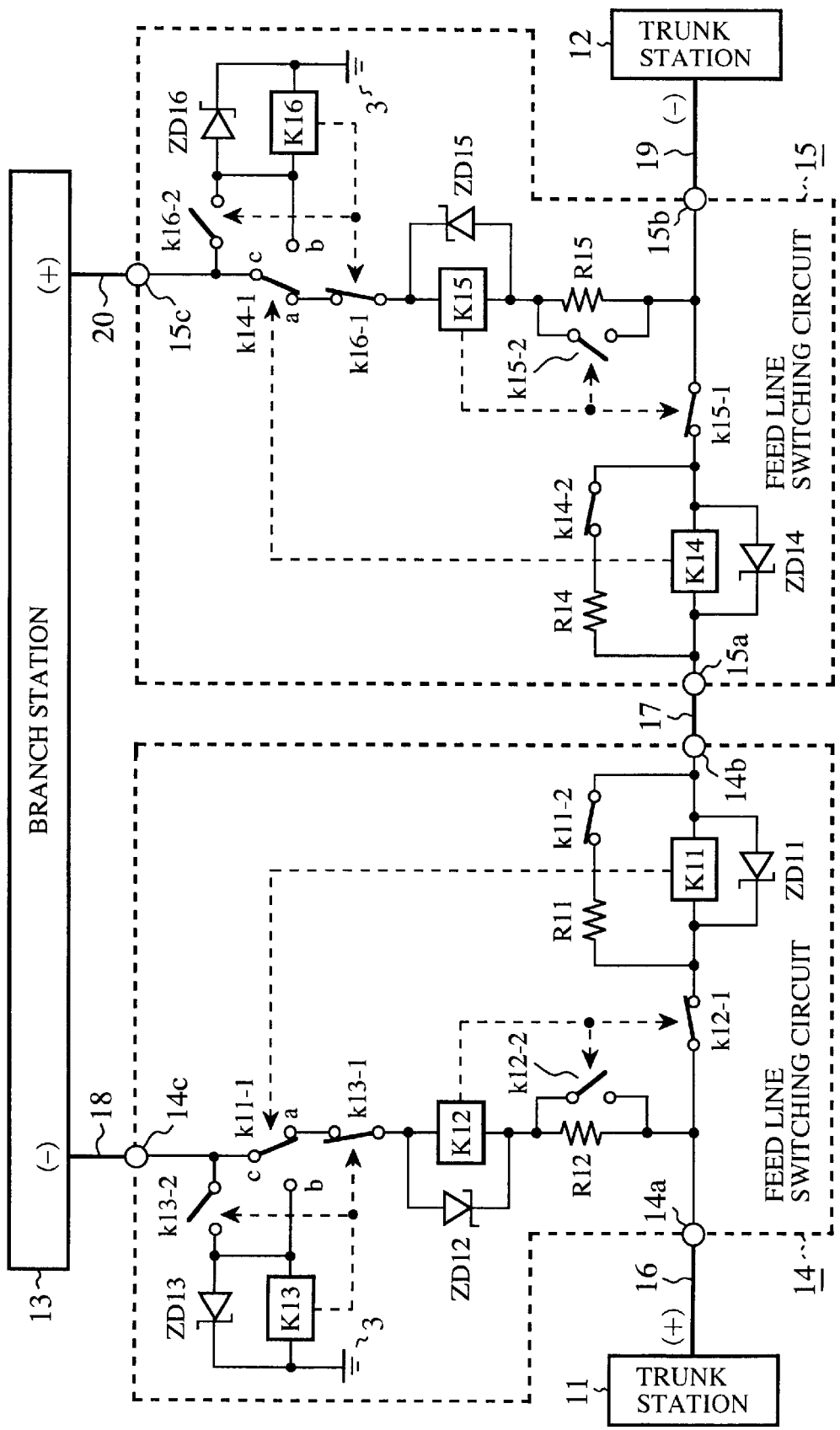
FIG. 3 is a circuit diagram showing a configuration of a feed line switching circuit of an embodiment 2 in accordance with the present invention.

FIG. 3 is a circuit diagram showing a configuration of a feed line switching circuit of an embodiment 2 in accordance with the present invention, in which the principle as illustrated in FIG. 2 is applied to a double-branching method. In FIG. 3, reference numerals 11 and 12 each designate a trunk station; 13 designates a branch station; 14 and 15 each designate a feed line switching circuit; 14a–14c and 15a–15c each designate a terminal; 16 designates a feed line connected across the trunk station 11 and the feed line switching circuit 14; 17 designates a feed line connected across the feed line switching circuits 14 and 15; 18 designates a feed line connected across the branch station 13 and the feed line switching circuit 14; 19 designates a feed line connected across the feed line switching circuit 15 and the trunk station 12; and 20 designates a feed line connected across the branch station 13 and the feed line switching circuit 15.

In the feed line switching circuit 14, the reference symbol K11 designates a relay connected across the feed lines 16 and 17; K12 designates a relay connected across the feed lines 16 and 18; and K13 designates a self-holding relay. The relays K11–K13 are each composed of a vacuum relay or the like, which operates in response to the feed current. In addition, the reference symbol k11-1 designates a contact of the relay K11; k12-1 and k12-2 each designate a contact set of the relay K12; and k13-1 and k13-2 each designate a contact of the relay K13.

Furthermore, the reference symbol k11-2 designates a contact of the relay K11; R11 designates a resistor constituting a series circuit with the contact k11-2, which series circuit is connected in parallel with the relay K11; and R12 designates a resistor connected in parallel with the contact k12-2. Reference symbols ZD11–ZD13 designate Zener diodes connected in parallel with the relays K11–K13, respectively.

In the feed line switching circuit 15, the reference symbol K14 designates a relay connected across the feed lines 17 and 19; K15 designates a relay connected across the feed lines 17 and 20; and K16 designates a self-holding relay. The relays K14–K16 are each composed of a vacuum relay or the like, which operates in response to the feed current. In addition, the reference symbol k14-1 designates a contact set of the relay K14; k15-1 and k15-2 each designate a contact of the relay K15; and k16-1 and k16-2 each designate a contact of the relay K16.

Furthermore, the reference symbol k14-2 designates a contact of the relay K14; R14 designates a resistor constituting a series circuit with the contact k14-2, which series circuit is connected in parallel with the relay K14; and R15 designates a resistor connected in parallel with the contact k15-2. Reference symbols ZD14–ZD16 designate Zener diodes connected in parallel with the relays K14–K16, respectively.

Next, the operation of the present embodiment 2 will be described with reference to FIG. 3.

First, to achieve the feeding across the trunk station 11 (+) and branch station 13 (−) by the feed current control, the relay K12 opens its contact k12-1 and closes its contact k12-2. As a result, the trunk station 11 (+) feeds the branch station 13 (−) with a current bypassing the resistor R12.

In addition, to achieve the feeding across the branch station 13 (+) and trunk station 12 (−) by the feed current control, the relay K15 opens its contact k15-1 and closes its contact k15-2. As a result, the branch station 13 (+) feeds the trunk station 12 (−) with a current bypassing the resistor R15.

Furthermore, to achieve the feeding across the trunk station 11 (+) and trunk station 12 (−) by the feed current control, the relay K11 opens the contacts c and a of the contact set k11-1 and closes the contacts c and b thereof. As a result, the relay K13 opens its contact k13-1 and closes its contact k13-2, thereby self-holding it. At the same time, the relay K11 opens its contact k11-2 to disconnect the resistor R11 connected in parallel with the relay K11. Likewise, the relay K14 opens the contacts c and a of the contact set k14-1 and closes the contacts c and b thereof. As a result, the relay K16 opens its contact k16-1 and closes its contact k16-2, thereby self-holding it. At the same time, the relay K14 opens its contact k14-2 to disconnect the resistor R14 connected in parallel with the relay K14.

When achieving the feeding across the trunk station 11 (+) and trunk station 12 (−) by the feed current control, since the contacts k12-2 and k15-2 are open, even if a shunt fault occurs on the feed line 18 or 20, it is possible for the resistor R12 or R15 to prevent unnecessary feeding from the shunt fault point.

Next, test results of the configuration as shown in FIG. 3 will be described.

The test was performed in the following conditions: The working current of the relays K11 and K14 was 60 mA, and the resistance R of the resistors R11 and R14 was made three time greater than the resistance r of the relays K11 and K14.

First, the feed line 18 and 20 sides were placed at a shunt fault state by grounding the terminals 14c and 15c, and the trunk station 11 (+) fed a current of 60 mA. As a result, a current of 35 mA flowed through the shunt fault point at the terminal 14c side, and a current of 24 mA flowed through the shunt fault point at the terminal 15c side, leaving nearly zero mA flowing from the terminal 15b to the trunk station 12 (−). In addition, a current of 24 mA flows across the terminal 14b and the terminal 15a, and a current of 18 mA flows through the relays K11 and K14 each.

In this state, the trunk station 12 (−) supplied 120 mA. As a result, the current flowing through the shunt fault point at the terminal 14c side was 11 mA, the current flowing through the shunt fault point at the terminal 15c side was 47 mA, the current flowing across the terminals 14b and 15a was 71 mA, and the current flowing through the relays K11 and K14 was 53 mA.

In this state, the current value of the trunk station 12 (−) was gradually increased from the 120 mA. As a result, the relays K11 and K14 were actuated at about the same time when the current value reached 135 mA. In the course of this, the current Ia flowing across the terminals 14b and 15a was reduced from 80 mA to 70 mA, followed by an increase of the current. The current value flowing through the relay K11 was 60 mA at the operation, and increased to 80 mA immediately after the operation. Subsequently, the current value Ib was reduced to 70 mA, followed by an increase thereof.

Therefore, it was possible to satisfy the relationship $(R/(r+R)) \times Ia < Ib$ by setting the current value Ia at 80 mA, and the current value Ib at 70 mA, and by setting the resistance R of resistors R11 and R14 at a value three times greater than the resistance r of the relays K11 and K14. As a result, the current flowing through the relays K11 and K14 increased with the operation of the relays K11 and K14. Although there was a temporal reduction in the current thereafter, it did not drop below the working current of the relays K11 and K14, thereby preventing the chattering.

As described above, the present embodiment 2 comprises the resistors R11 and R14 for preventing the reduction in the current values flowing through the relays K11 and K14. As a result, it can positively switch the feed line with preventing the chattering of the relays K11 and K14 even if the shunt fault occurs at the feed lines 18 and 20 side.

In addition, since the resistors R11 and R14 are disconnected at the same time as the contacts k11-1 and k14-1 for switching the feed line are opened, the resistors R11 and R14 can accomplish their function to prevent the reduction in the current value flowing through the relays K11 and K14 at the same time when the feed line is switched.

Furthermore, even if a shunt fault occurs on the feed line 18 or 20 during the feeding across the trunk station 11 (+) and trunk station 12 (−), since the contact k12-2 and k15-2 are open, the resistors R12 and R15 can prevent the unnecessary feeding from the shunt fault point, thereby enabling positive feed line switching.

Moreover, although the resistors R12 and R15 could hinder the feeding during the feeding across the trunk station 11 (+) and the branch station 13 (−) or across the branch station 13 (+) and trunk station 12 (−), since the contacts k12-2 and k15-2 are closed during the operation of the relays K12 and K15, the feeding bypasses the resistors R12 and R15, making it possible to avoid the hindrance of the feeding.

Embodiment 3

Figure 4:
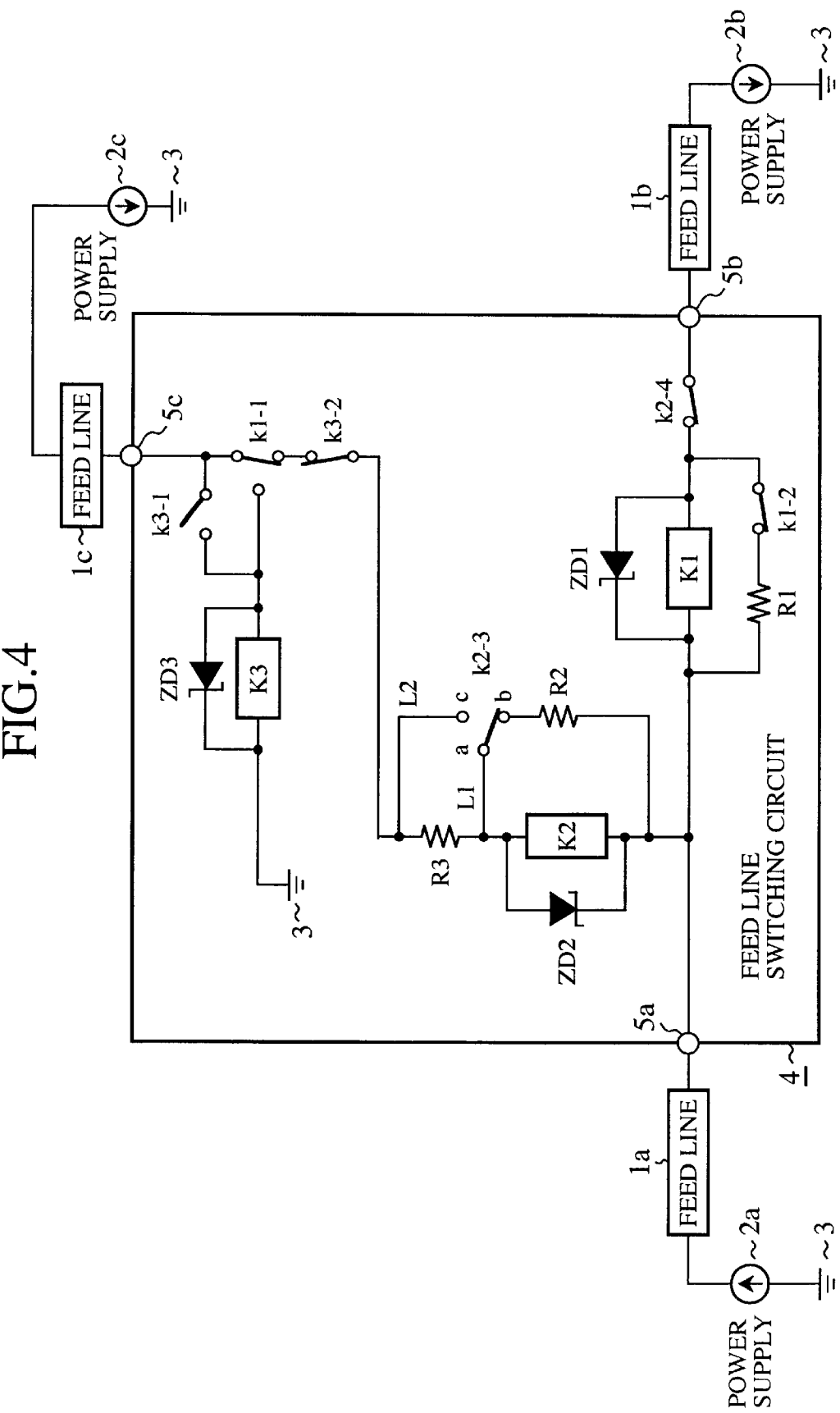
FIG. 4 is a circuit diagram showing a configuration of a feed line switching circuit of an embodiment 3 in accordance with the present invention.
Figure 7:
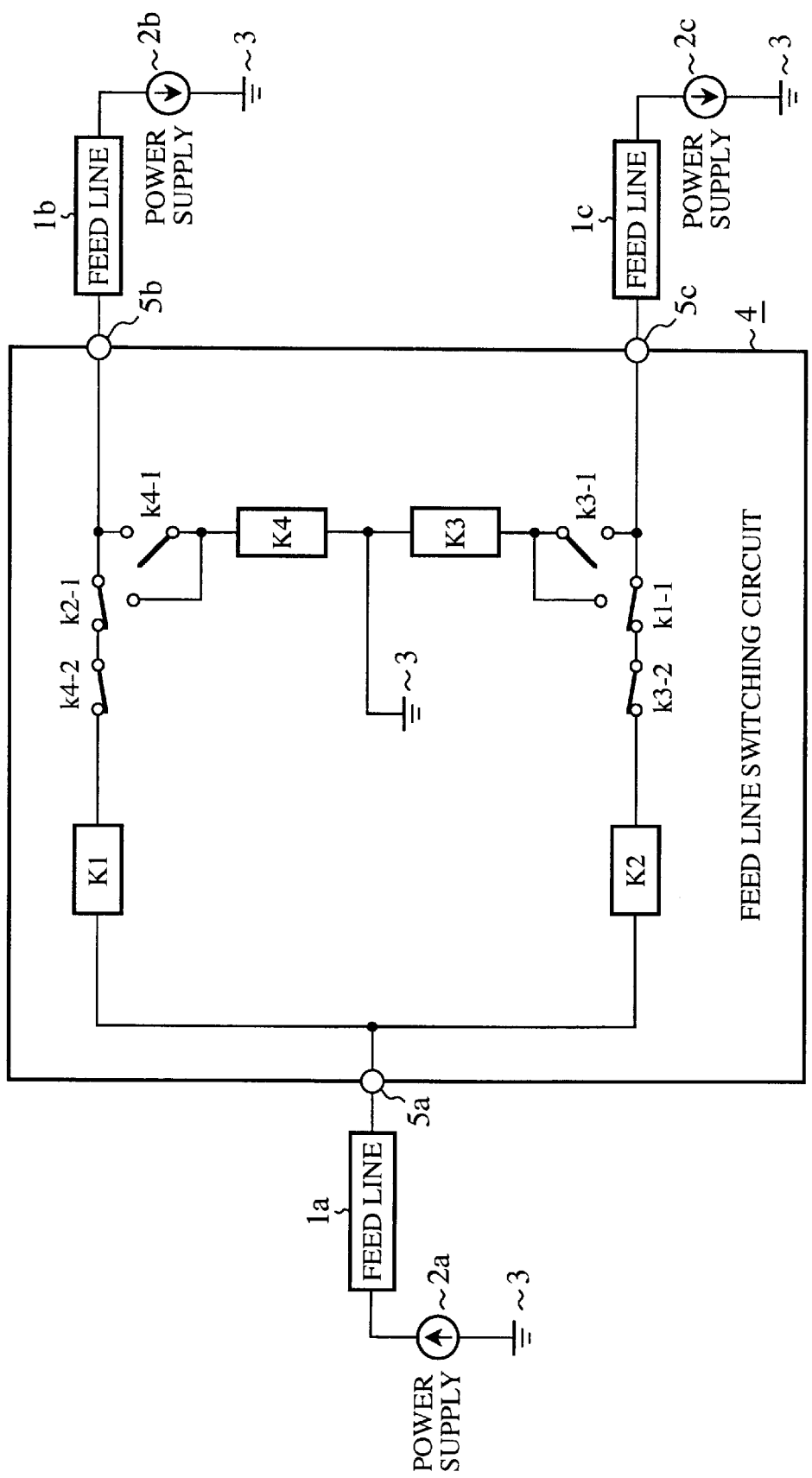
FIG. 7 is a circuit diagram showing a configuration of a conventional feed line switching circuit.

FIG. 4 is a circuit diagram showing a configuration of a feed line switching circuit of an embodiment 3 in accordance with the present invention. In FIG. 4, the reference symbol R3 designates a resistor constituting a series circuit with a relay K2, which series circuit is connected across the feed lines 1a and 1c. The reference symbol L1 designates a line, a first end of which is connected to the connecting point of the relay K2 and resistor R3, and a second end of which is connected to a contact a of a contact set k2-3 of the relay K2; R2 designates a resistor, a first end of-which is connected to a relay K2 side end of the series circuit, and a second end of which is connected to a contact b of the contact set k2-3 of the relay K2; and L2 designates a line, a first end of which is connected to a resistor R3 side end of the series circuit, and a second end of which is connected to a contact c of the contact set k2-3 of the relay K2. The reference symbol k2-3 designates the contact set of the relay K2 that closes the contacts a and b and opens the contacts a and c when the relay K2 is unenergized, and that closes the contacts a and c and opens the contacts a and b when the relay K2 is energized. The reference symbol k2-4 designates a contact of the relay K2 that is connected between the feed lines 1a and 1b, and that closes when the relay K2 is unenergized and opens when the relay K2 is energized. The remaining configuration is the same as that of FIG. 1.

Next, the operation of the present embodiment 3 will be described.

Figure 5:
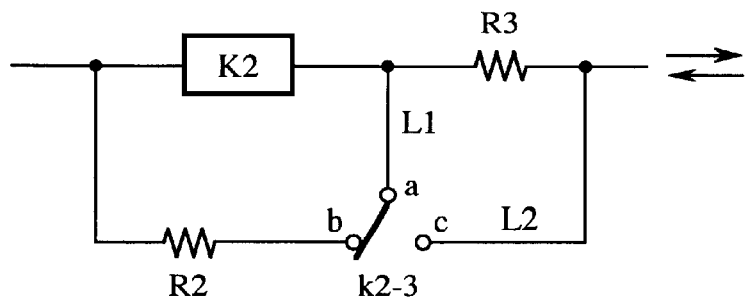
FIG. 5 is a circuit diagram showing a principle of a parallel circuit of the embodiment 3 when the relay K2 is in the unenergized state.
Figure 6:
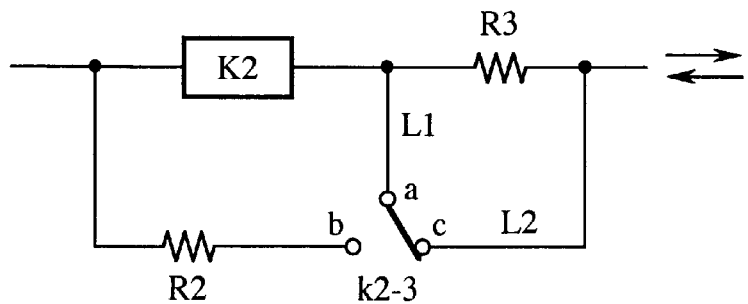
FIG. 6 is a circuit diagram showing a principle of a parallel circuit of the embodiment 3 when the relay K2 is in the energized state.

First, the principle of the present embodiment 3 will be described with reference to FIGS. 5 and 6 which illustrate the principle of a parallel circuit of the embodiment 3 in accordance with the present invention. Here, FIG. 5 illustrates the state when the relay K2 is unenergized, and FIG. 6 illustrates the state when the relay K2 is energized. As illustrated in FIGS. 4 and 5, when the relay K2 is unenergized, a passage is established starting from the feed line 1a, passing through the parallel circuit of the relay K2 with the resistor R2, and the resistor R3, and arrives at the feed line 1c. Accordingly, even if a shunt fault occurs at the feed line 1c side during feeding across the feed lines 1a and 1b, the resistor R3 connected between the feed lines 1a and 1c can prevent unnecessary feeding from the shunt fault point, thereby enabling a positive switching of the feed line.

On the other hand, when the relay K2 is energized as illustrated in FIGS. 4 and 6, a passage is established starting from the feed line 1a, passing through the relay K2 and the bypass circuit of the resistor R3 consisting of the lines L1 and L2, and arrives at the feed line 1c. Thus bypassing the resistor R3 by the lines L1 and L2 makes it possible to avoid the hindrance of the feeding during the feeding across the feed lines 1a and 1c.

In addition, achieving these functions by the single relay K2 and the single contact set k2-3 makes it possible to implement the simple configuration without increasing the number of the relays and contacts, thereby enabling low-cost configuration without increasing a fault factor.

Incidentally, the setting conditions imposed on the resistance r of the relays K1 and K2 and the resistance R of the resistors R1 and R2 are assumed to be identical to those of the foregoing embodiment 1.

Next, test results of the configuration of FIG. 4 will be described.

The test was performed in the following conditions: The working current of the relays K1 and K2 was 60 mA; the resistance r of the relays K1 and K2 and the resistance R of the resistors R1 and R2 were both 200Ω; and the resistor R3 was 1000Ω.

First, the power supply 2b was disconnected from the feed line 1b, and the power supply 2a fed 60 mA. As a result, a current of 30 mA flowed through the relay K2, and a current of 60 mA flowed through the resistor R3. In this case, the voltage drop across the terminals 5a and 5c was 70 V.

In this state, the power supply 2c fed 120 mA. As a result, the relay K2 was actuated so that the contact set k2-3 was transferred and the contact k2-4 was opened. In this case, a current of 120 mA flowed through the relay K2, and almost no current flowed through the resistor R3. In addition, the voltage drop across the terminals 5a and 5c was 15 V.

After that, the feeding was temporarily halted. Then, the power supply 2b was connected to the feed line 1b, and the terminal 5c was grounded to make a shunt fault state, followed by feeding a current of 60 mA from the power supply 2a. As a result, a current of 50 mA flowed through the feed line 1b, and a current of 10 mA flowed through the shunt fault point of the feed line 1c.

In this state, the power supply 2b fed 120 mA. As a result, the relay K1 was actuated so that the contact set k1-1 was transferred and the contact k1-2 was opened. In this case, a current of 120 mA flowed through the relay K1, and a current of 0 mA flowed through the shunt fault point of the feed line As described above, the present embodiment 3 comprises the resistor R2 for preventing the reduction in the current value flowing through the relay K2. As a result, it can prevent the current value flowing through the relay K2 from being reduced after the relay K2 is actuated even if the shunt fault occurs at the feed line 1b side, thereby preventing the chattering of the relay K2, and positively switching the feed line.

In addition, since the resistor R2 is disconnected at the same time as the contact k2-4 for switching the feed line is opened, the resistor R2 can accomplish its function to prevent the reduction in the current value flowing through the relay K2 at the same time when the feed line is switched.

Furthermore, even if a shunt fault occurs at the feed line 1c side during the feeding across the feed lines 1a and 1b, the resistor R3 connected between the feed lines 1a and 1c can prevent unnecessary feeding from the shunt fault point, thereby enabling positive switching of the feed line.

Moreover, bypassing the resistor R3 by the lines L1 and L2 during the feeding across the feed lines 1a and 1c makes it possible to eliminate the hindrance of the feeding.

In addition, achieving these functions by the single relay K2 and the single contact set k2-3 makes it possible to implement a simple configuration without increasing the number of the relays and contacts, thereby enabling low-cost configuration without increasing a fault factor.

Incidentally, it is not necessary for each resistor of the foregoing embodiments to be composed of a single resistor. It can be composed a plurality of resistors, or replaced by other elements that have resistance as an assemblage. Any elements with any structure can be utilized as long as they have a resistance that meets the required conditions, making it possible to expand the selection range in the design and manufacturing.

In addition, the foregoing embodiments can be integrated into the branching unit as its feed line switching circuit, offering a marked advantage in the branching unit that is likely to suffer from a shunt fault.

What is claimed is:

1. A feed line switching circuit for switching feeding by feed current control between feeding across a first feed line and a second feed line and feeding across the first feed line and a third feed line, said feed line switching circuit comprising:

a relay that is connected between said first feed line and said second feed line, and operates in response to a feed current flowing through said relay;

a first contact of said relay that closes when said relay is unenergized and opens when said relay is energized; and a resistor that constitutes a series circuit with said first contact, which series circuit is connected in parallel with said relay, wherein a resistance r of said relay and a resistance R of said resistor are set to satisfy a relationship of $$(R/(r+R)) \times Ia < Ib$$

where Ia is a current value flowing through said second feed line immediately before operation of said relay, and Ib is a current value flowing through said second feed line immediately after the operation of said relay.

2. The feed line switching circuit according to claim 1, wherein each of said resistors consists of any one of a single resistor, a combination of a plurality of resistors and an assemblage of other elements that provides resistance in its entirety.

3. The feed line switching circuit according to claim 1, wherein said relay further comprises a second contact that is connected between said first feed line and said third feed line, and that closes when said relay is unenergized and opens when said relay is energized.

4. The feed line switching circuit according to claim 3, wherein each of said resistors consists of any one of a single resistor, a combination of a plurality of resistors and an assemblage of other elements that provides resistance in its entirety.

5. A feed line switching circuit for switching feeding by feed current control between feeding across a first feed line and a second feed line and feeding across the first feed line and a third feed line, said feed line switching circuit comprising:

a relay that constitutes a series circuit with a first resistor, and operates in response to a feed current flowing through said relay, said series circuit being connected between said first feed line and said third feed line;

a first contact of said relay that closes a connection between a first terminal and a second terminal and opens a connection between the first terminal and a third terminal when said relay is unenergized, and that closes the connection between the first terminal and the third terminal and opens the connection between the first terminal and the second terminal when said relay is energized;

a second contact of said relay that is connected between said first feed line and said second feed line, and that closes when said relay is unenergized, and opens when said relay is energized;

a first line, one end of which is connected to a connecting point of said relay and said first resistor, and another end of which is connected to said first terminal;

a second resistor, one end of which is connected to the relay side end of said series circuit, and another end of which is connected to said second terminal; and a second line, one end of which is connected to the first resistor side of said series circuit, and another end of which is connected to said third terminal, wherein a resistance r of said relay and a resistance R of said second resistor are set to satisfy a relationship of $$(R/(r+R)) \times Ia < Ib$$

where Ia is a current value flowing through said third feed line immediately before operation of said relay, and Ib is a current value flowing through said third feed line immediately after the operation of said relay.

6. The feed line switching circuit according to claim 5, wherein each of said resistors consists of any one of a single resistor, a combination of a plurality of resistors and an assemblage of other elements that provides resistance in its entirety.

7. A branching unit including a feed line switching circuit for switching feeding by feed current control between feeding across a first feed line and a second feed line and feeding across the first feed line and a third feed line, said feed line switching circuit comprising:

a relay that is connected between said first feed line and said second feed line, and operates in response to a feed current flowing through said relay;

a first contact of said relay that closes when said relay is unenergized and opens when said relay is energized; and a resistor that constitutes a series circuit with said first contact, which series circuit is connected in parallel with said relay, wherein a resistance r of said relay and a resistance R of said resistor are set to satisfy a relationship of $$(R/(r+R)) \times Ia < Ib$$

where Ia is a current value flowing through said second feed line immediately before operation of said relay, and Ib is a current value flowing through said second feed line immediately after the operation of said relay.

* * * * *